US010237778B2

(12) United States Patent
Choi et al.

(10) Patent No.: US 10,237,778 B2
(45) Date of Patent: Mar. 19, 2019

(54) METHOD FOR REPORTING BUFFER STATUS OF TERMINAL AND APPARATUS THEREFOR IN SYSTEM IN WHICH HETEROGENEOUS WIRELESS COMMUNICATION TECHNOLOGIES ARE UTILIZED

(71) Applicant: LG ELECTRONICS INC., Seoul (KR)

(72) Inventors: Hyeyoung Choi, Seoul (KR); Heejeong Cho, Seoul (KR); Hyunsoo Ko, Seoul (KR); Ilmu Byun, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 15/507,144

(22) PCT Filed: Nov. 3, 2014

(86) PCT No.: PCT/KR2014/010431
§ 371 (c)(1),
(2) Date: Feb. 27, 2017

(87) PCT Pub. No.: WO2016/043376
PCT Pub. Date: Mar. 24, 2016

(65) Prior Publication Data
US 2017/0289839 A1 Oct. 5, 2017

Related U.S. Application Data

(60) Provisional application No. 62/052,486, filed on Sep. 19, 2014.

(51) Int. Cl.
H04W 28/02 (2009.01)
H04W 72/04 (2009.01)
(Continued)

(52) U.S. Cl.
CPC ....... *H04W 28/0278* (2013.01); *H04L 5/0035* (2013.01); *H04L 5/0053* (2013.01);
(Continued)

(58) Field of Classification Search
CPC ..... H04W 84/12; H04W 80/04; H04W 84/18; H04W 88/06; H04W 74/08
(Continued)

(56) References Cited

U.S. PATENT DOCUMENTS

| 9,635,655 | B2 | 4/2017 | Jha et al. | |
| 9,722,743 | B2 | 8/2017 | Li et al. | |
| 2013/0083783 | A1 | 4/2013 | Gupta et al. | |
| 2014/0269352 | A1* | 9/2014 | Sun | H04W 72/1284 370/250 |
| 2014/0321376 | A1 | 10/2014 | Damnjanovic et al. | |

(Continued)

FOREIGN PATENT DOCUMENTS

| EP | 2723144 A1 * | 4/2014 | ............ H04W 28/08 |
| WO | 2013086362 | 6/2013 | |

OTHER PUBLICATIONS

NSN, Nokia Corporation, "BSR and SR for dual connectivity," 3GPP TSG-RAN WG2 #84, R2-133855, Nov. 2013, 7 pages.
(Continued)

Primary Examiner — Brenda H Pham
(74) Attorney, Agent, or Firm — Lee Hong Degerman Kang Waimey

(57) ABSTRACT

The present invention relates to a method for reporting a buffer status and an apparatus therefor in a heterogeneous wireless communication system. A terminal receives a configuration message for a multi-RAT integration scheduling from a cellular controller, and, on the basis of the configuration message, can report the buffer status in a format comprising identification information for a logic channel and a multi-RAT scheduling indication field.

7 Claims, 15 Drawing Sheets

(51) Int. Cl.
  *H04W 72/12* (2009.01)
  *H04W 88/10* (2009.01)
  *H04W 72/06* (2009.01)
  *H04L 5/00* (2006.01)
  *H04W 28/08* (2009.01)

(52) U.S. Cl.
  CPC ....... *H04W 72/0406* (2013.01); *H04W 72/06* (2013.01); *H04W 72/1226* (2013.01); *H04W 72/1278* (2013.01); *H04W 72/1284* (2013.01); *H04W 88/10* (2013.01); *H04L 5/003* (2013.01); *H04L 5/0032* (2013.01); *H04W 28/08* (2013.01)

(58) Field of Classification Search
  USPC ............. 370/310.2, 328, 349, 338, 329, 341
  See application file for complete search history.

(56) References Cited

U.S. PATENT DOCUMENTS

2015/0043492 A1\* 2/2015 Baek ................... H04W 76/025
 370/329
2015/0358838 A1  12/2015 Wei et al.

OTHER PUBLICATIONS

Qualcomm Incorporated, "BSR considerations for dual connectivity with bearer splitting," 3GPP TSG-RAN WG2 #84, R2-133997, Nov. 2013, 5 pages.
PCT International Application No. PCT/KR2014/010431, Written Opinion of the International Searching Authority dated May 27, 2015, 4 pages.
U.S. Appl. No. 15/507,234, Office Action dated May 2, 2018, 14 pages.

\* cited by examiner

FIG. 7A

```
Dynamic multi-RAT scheduling configuration{
    Dynamic multi-RAT Scheduling    SEQUENCE{
        DRB ID or logicalChannelIdentity or logicalChannelgroupIdentity    INTEGER (0..xx) }
    No-Dynamic multi-RAT Scheduling    SEQUENCE{
        DRB ID or logicalChannelIdentity or logicalChannelgroupIdentity    INTEGER (0..xx) }}
}
```

FIG. 7B

```
Dynamic multi-RAT scheduling configuration{
    Dynamic multi-RAT scheduling DRB/ logicalChannelIdentity/ logicalChannelgroupIdentityIndex    INTEGER (0..xx)
}
```

FIG. 7C

```
Dynamic multi-RAT scheduling configuration{
    Dynamic multi-RAT scheduling indicator    ENUMERATED {Dynamic multi-RAT scheduling, No- Dynamic multi-RAT scheduling }
}
```

FIG. 8A

| DMS Indicator | LCG ID | Buffer Size |
|---|---|---|

FIG. 8B

| DMS Indicator | Buffer Size LCG #0 | Buffer Size LCG #1 | Buffer Size LCG #2 | Buffer Size LCG #3 |

METHOD FOR REPORTING BUFFER STATUS OF TERMINAL AND APPARATUS THEREFOR IN SYSTEM IN WHICH HETEROGENEOUS WIRELESS COMMUNICATION TECHNOLOGIES ARE UTILIZED

CROSS-REFERENCE TO RELATED APPLICATIONS

This application is the National Stage filing under 35 U.S.C. 371 of International Application No. PCT/KR2014/010431, filed on Nov. 3, 2014, which claims the benefit of U.S. Provisional Application No. 62/052,468, filed on Sep. 19, 2014, the contents of which are all hereby incorporated by reference herein in its entirety.

BACKGROUND OF THE INVENTION

Field of the Invention

The present invention relates to mobile communication, and more particularly, to a method and device for reporting a buffer status of a terminal in a system to which heterogeneous wireless communication technologies are applied.

Related Art

Nowadays, an LTE-A based communication service may provide a much faster speed than wire Internet to users. Accordingly, a user equipment that may receive an IP based service based on a cellular network such as LTE-A is widely used. The user uses an Internet Protocol (IP) based service such as Voice over LTE (VoLTE) and audiovisual communication through a user equipment. It is estimated that such an LTE-A based wireless Internet service will further increase.

Various communication systems such as LTE or LTE-A and a Wireless Local Area Network (WLAN), mobile World Interoperability for Microwave Access (WiMAX), and High Speed Downlink Packet Access (HSDPA) in which a transmission speed, coverage per base station, mobility, and a data use cost are different may be used as a next generation mobile communication network. That is, a plurality of radio access technologies (RAT) may coexist, and the user may select and access a network according to preference or a peripheral communication environment.

Specifically, current mobile devices such as a smart phone and a smart pad simultaneously have a 4G long term evolution-advanced (LTE-A) interface and a wireless local area network (WLAN) interface. Further, mobile communication providers support a wireless Internet service through a WiFi zone as well as a 4G network having wide coverage.

As a service is provided to the terminal through such a cellular network and WLAN network, various portions such as handover and data offloading should be considered.

SUMMARY OF THE INVENTION

Technical Problem

The present invention provides a method in which a multi-RAT terminal reports a multi-RAT integration buffer status in order to dynamically assign a resource of a cellular network and a WLAN, when a cellular controller acquires information about a channel situation and a load of the cellular network and the WLAN.

Technical Solution

In an aspect, a method of reporting a buffer status of a terminal includes: receiving a setup message of multi-radio access technology (RAT) integration scheduling from a cellular controller; and reporting a buffer status in a format including a multi-RAT scheduling indication field and identifier information about a logical channel based on the setup message The setup message of the multi-RAT integration scheduling may be included and received in a system information block or an RRC connection (re)setup message.

The setup message of the multi-RAT integration scheduling may include condition information about the buffer status report.

The condition information may include a time threshold value compared with an access time that reports a buffer status through a WLAN, and the buffer status may be reported, when the access time includes the time threshold value and exceeds the time threshold value.

The method may further include receiving a UE capability enquiry message that determines whether a buffer status may be reported to correspond to the multi-RAT integration scheduling from the cellular controller.

The reporting of a buffer status may include reporting a buffer status based on a branched layer of a bearer to which the multi-RAT integration scheduling is set, when a bearer of a cellular network is split to be provided to a WLAN.

Advantageous Effects

According to the present invention, when a cellular controller acquires information about a channel situation and a load of a cellular network and a WLAN, a method is provided in which a multi-RAT terminal reports a multi-RAT integration buffer status in order to dynamically assign a resource of the cellular network and the WLAN.

BRIEF DESCRIPTION OF THE DRAWINGS

FIG. 7A is a diagram illustrating a dynamic multi-RAT scheduling setup message according to an exemplary embodiment of the present invention.

FIG. 7B is a diagram illustrating a dynamic multi-RAT scheduling setup message according to another exemplary embodiment of the present invention.

FIG. 7C is a diagram illustrating a dynamic multi-RAT scheduling setup message according to another exemplary embodiment of the present invention.

FIG. 8A is a diagram illustrating a BSR format according to an exemplary embodiment of the present invention.

FIG. 8B is a diagram illustrating a BSR format according to another exemplary embodiment of the present invention.

DESCRIPTION OF EXEMPLARY EMBODIMENTS

A wireless device may be fixed or may have mobility and may be referred to as different terms such as a User Equipment (UE), a mobile station (MS), a user terminal (UT), a subscriber station (SS), and a mobile terminal (MT). Further, the terminal may be a device that can carry and having a communication function, such as a mobile phone, a personal digital assistant (PDA), a smart phone, a wireless modem, and a notebook computer or may be a device that cannot carry, such as a personal computer (PC) and a vehicle mounting device. A base station indicates a fixed station that generally communicates with a wireless device and may be referred to as different terms such as an evolved-NodeB (eNB), a Base Transceiver System (BTS), and an access point.

Hereinafter, it will be described that the present invention is applied based on 3rd Generation Partnership Project (3GPP) long term evolution (LTE) or 3GPP LTE-Advanced (LTE-A). This is only an illustration and the present invention may be applied to various wireless communication systems. Hereinafter, LTE may include LTE and/or LTE-A.

This specification describes a communication network as an object, and a work that performs in a communication network may be performed in a process in which a system (e.g., a base station) that controls the communication network controls a network and transmits data or a work may be performed in a terminal linked to the network.

Figure 1:
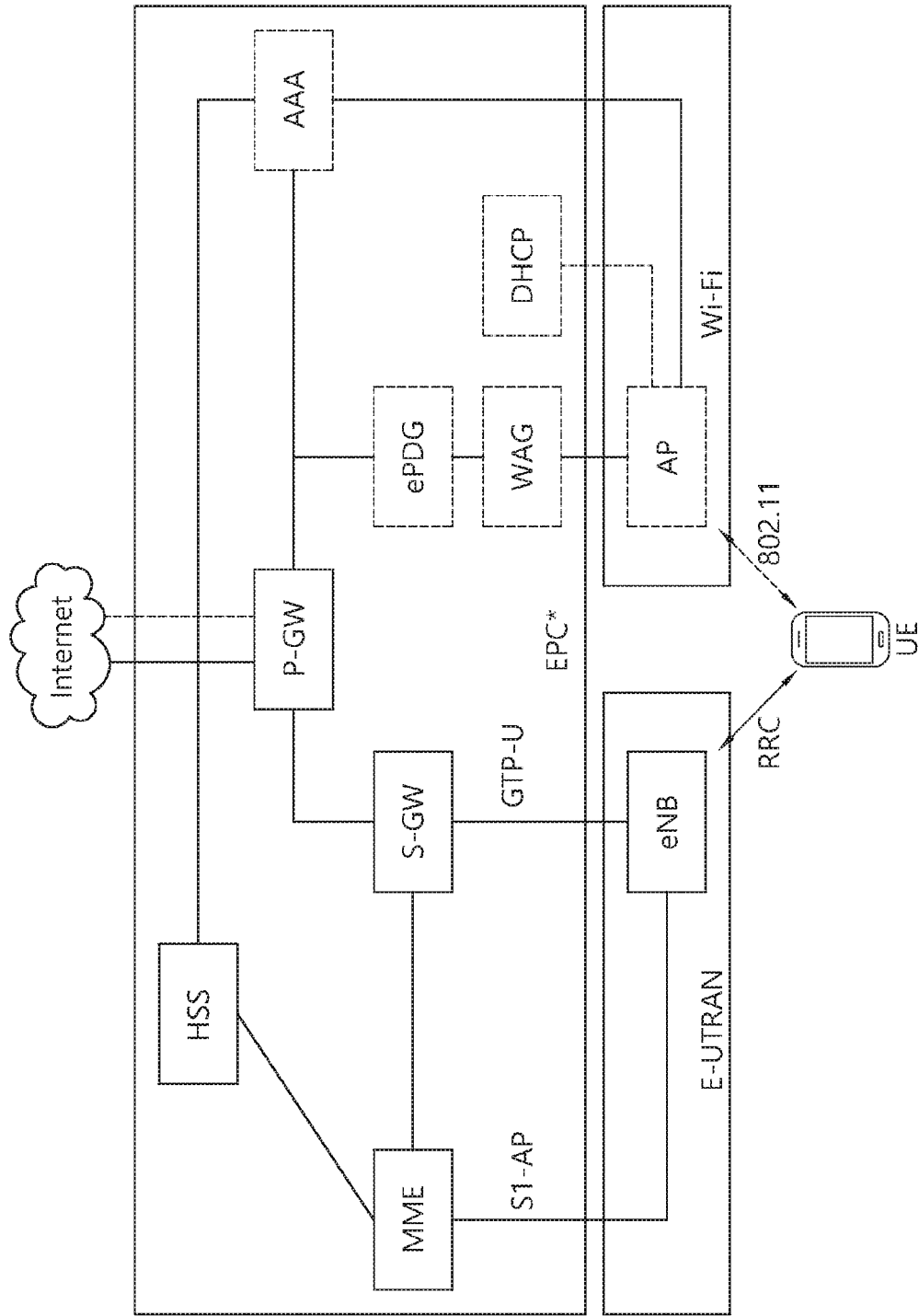
FIG. 1 is a conceptual diagram illustrating a method of transmitting and/or receiving data based on a heterogeneous network system.

FIG. 1 is a conceptual diagram illustrating a method of transmitting and/or receiving data based on a heterogeneous network system.

FIG. 1 illustrates a wireless communication method of a Station (STA) based on interworking between a WLAN system and a cellular network (e.g., a network based on an LTE system and an LTE-A system) system among heterogeneous network systems (or a plurality of radio access technology (RAT) systems). Hereinafter, the STA means a UE that may be fixed or may have mobility and hereinafter, the STA is represented with a UE.

Referring to FIG. 1, the UE may have a capability that can access to both an Access point (AP) of a WLAN and an eNB of a cellular network. In order to access to a specific network among the WLAN and the cellular network, the UE may request connection to the specific network. When switching based multi-RAT access technology is applied, even if the UE may access to each heterogeneous network, the UE cannot simultaneously access to the entire heterogeneous network.

The eNB may be connected to a serving gateway (S-GW)/mobility management entity (MME) through a cellular network interface.

An MME has access information of the UE or information about a capability of the UE, and such information may be generally used for mobility management of the UE. The MME performs a function of a control plane.

The S-GW is a gateway having an E-UTRAN as a terminal point. The S-GW performs a function of a user plane. The S-GW/MME is connected to a packet data network (PDN) gateway (P-GW) and a home subscriber server (HSS) through a cellular network interface. The PDN-GW is a gateway having a PDN as a terminal point.

Further, the P-GW and the HSS are connected to a 3GPP access authentication authorization (AAA) server through the cellular network interface. The P-GW and the 3GPP AAA server may be connected to an evolved packet data gateway (e-PDG) through the cellular network interface. The e-PDG may be included only in unreliable non-3GPP access. A WLAN access gateway (WAG) may perform a function of a P-GW in a WLAN system.

Conventional communication on heterogeneous network through a WLAN and cellular network was performed based on a request of a UE. In an existing case, UE request based interworking of a method in which a specific network server manages WLAN information and performs handover between a WLAN and a cellular network by a request of the UE was performed rather than direct interworking between a WLAN and a cellular network.

Further, upon communicating on a heterogeneous network, the control of a radio level was not performed, and only flow mobility/IP-flow mapping of a network level was supported.

That is, in communication on a conventional heterogeneous network, connection for transmission and/or reception of direct control information between a WLAN and a cellular network was not required.

However, in order to increase efficiency of a UE that performs communication based on the WLAN and the cellular network, communication on a heterogeneous network based on direct interworking between the WLAN and the cellular network is required rather than communication on a heterogeneous network based on a request of the UE. When transmission and reception of direct control information between the WLAN and the cellular network is performed, efficient and fast interworking between the WLAN and the cellular network may be performed.

In an existing WLAN environment, as the number of UEs increases, a resource using when the UE accesses may increase in proportional thereto.

An endless user request for bandwidth extension causes congestion increase and reduction of a relative transmission speed of an entire wireless network. Therefore, in order to guarantee a service of an application requiring a strict Quality of Service (QoS) even in a network of high congestion, a network manager requires a new mechanism, and due to such requirements, a more enhanced Medium Access Control (MAC) protocol than that in an existing WLAN was finally developed.

An IEEE 802.11 MAC protocol defines a Distributed Coordination Function (DCF), which is an essential function and a Point Coordination Function (PCF), which is a selection function. That is, a transmission medium may operate in both a DCF, which is a contention mode and a PCF, which is a contention free mode.

The DCF is an asynchronous transmitting method, provides a basic medium access method of 802.11 MAC, and is implemented in an entire commercial WLAN product. The DCF does not consider a priority between stations (a UE, hereinafter, may be referred to as 'STA') in wireless medium access. A characteristic of such a DCF does not reflect various forms of data traffic transmission and thus the DCF cannot finally support a QoS in which a user requires.

A synchronous transmitting method is a medium access method through polling and is implemented by a PCF. The PCF uses a central control type polling function of locating a Point Coordination (PC) function at a base station of the center to enable the base station to directly control a service of an entire STA. That is, in order to give an opportunity that may transmit a frame to each STA, the base station periodically performs polling of coupled STAs.

The DCF may not satisfy QoS requirements required for real time data transmission. In order to compensate this, various techniques that provide a QoS by adjusting a DCF function provided in 802.11 MAC were appeared. In order to provide a more advanced QoS in a WLAN, 802.11e MAC is provided in which existing 802.11 MAC is compensated.

802.11e prescribes a Hybrid Coordination Function (HCF) based on existing 802.11 MAC protocol DCF and PCF. The HCF includes a new medium approach mechanism for enhancing a QoS of a WLAN and may transmit QoS data in both a contention cycle and a non-contention cycle.

In a power saving mode of a UE according to 802.11, a sleep mode, i.e., a doze mode is defined.

In a doze mode, in order to save power of the UE, when data in which the UE is to transmit do not exist or when data to be transmitted to the UE do not exist, operation of a transceiver may be stopped for a predetermined time.

By describing a listen interval of an initial association request frame, the UE may be changed from an awake mode to a doze mode, the UE may transmit a null data frame in which a value of a power management field of a MAC header is set to 1, as needed, receive an ACK signal thereof, and enter from an awake mode to a doze mode.

In a doze mode, the UE may temporarily awake, determine beacon frame around a time point in which a beacon frame is transmitted, and determine a Traffic Indication map (TIM) information element.

When a bit value corresponding to an association id in a wireless local area network system (AID) thereof is set to 1 at a TIM, the UE awakes and transmits a poll to an assigned resource according to an AID thereof at a duration of a Power Save (PS)-Poll message, thereby being changed from a doze mode to an awake mode.

An AP, having received such a PS-Poll frame may transmit data while buffering to the UE. When a buffered frame is at least one, the AP may set more data bit to 1 and notify the UE that a frame further exists.

In a cellular network, for example LTE, a paging procedure is as follows.

The UE may operate in a sleep mode according to a Discontinuous Reception triggering (DRX) parameter value using DRX triggering information included in an RRC connection environment setup message.

Figure 2:
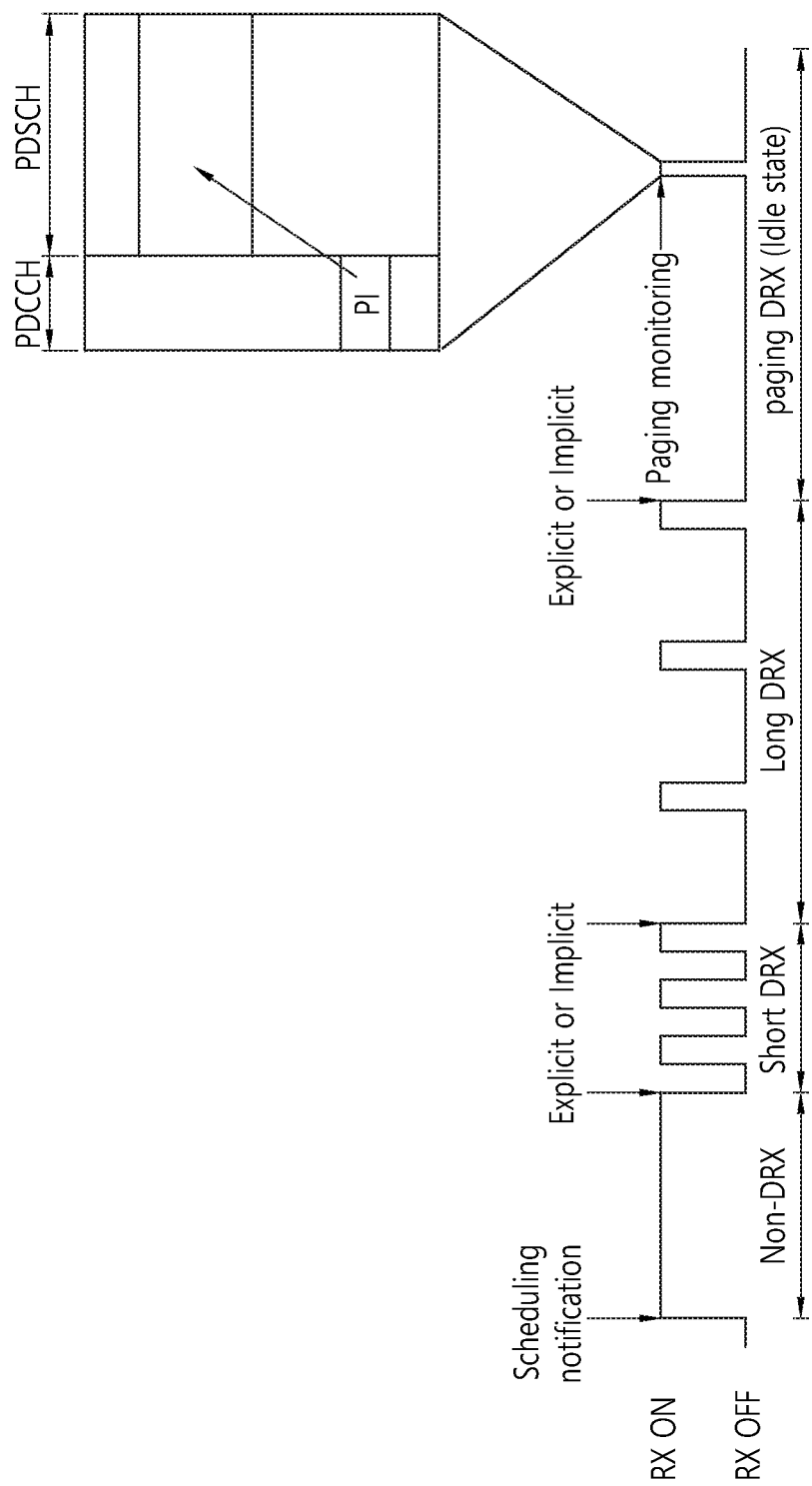
FIG. 2 is a diagram illustrating a DRX mode of a terminal.

FIG. 2 is a diagram illustrating a DRX mode of a UE.

As shown in FIG. 2, the UE that receives no data for a predetermined time may be changed to a non-DRX (active mode)→a short DRX (short sleep mode)→a long DRX (long sleep mode)→a paging DRX (paging idle mode).

When the UE detects that scheduled data exist through a control channel for a listening interval, the UE may convert a mode thereof to a non-DRX mode and receive data. Such a DRX may be configured through a BCCH and a Non Access Stratum (NAS).

Here, when the UE is in an idle state, a location of the UE is managed in a tracking area (TA) unit by an MME, and a base station such as an eNB releases entire information of the UE.

In this case, in order to receive DL data that may be transmitted to the UE, the UE accessed to a cellular network may awake at every paging DRX duration cycle and determine a paging channel (PCH) thereof.

The UE may awake in a subframe assigned thereto at every paging DRX thereof to monitor a PCH and determine whether a paging message transmitted by blind decoding with a Paging Radio Network Temporary Identifier (RNTI) exists.

When a plurality of UEs are connected, a paging group may be transmitted to a Physical Downlink Control Channel (PDCCH), and an individual UE may be identified in a PCH.

Only one subframe may be assigned in a paging interval of the UE, and a network may distribute UEs at different paging events. In this case, for a PCH, one paging RNTI may be used.

A paging message may include information about at least one UE ID, Earthquake and Tsunami Warning System Notification (ETWS Notification), and System Information Change Notification (SI Change Notification).

The UE-category field may be defined to a field including information about an uplink and downlink capability, and such UE-category information may be configured with UE Radio Capability information and UE Core Network Capability information.

The UE Radio capability information may be configured with information on an RAT in which the UE can support, such as a power grade and a frequency band. Such information may be unpreferable information to transmit across a wireless interface, for example considerable large information of 50 octet or more, whenever the UE is changed from Evolved Connection Management-idle (ECM-idle) to an Evolved Connection Management-CONNECTED (ECM-CONNECTED). In order to avoid such a wireless overhead, the MME stores UE Capability Information for an ECM-IDLE state, and if possible, the MME should include a maximum value of UE radio capability information in an S1 interface INITIAL CONTEXT SETUP REQUEST message and transmit the S1 interface INITIAL CONTEXT SETUP REQUEST message to the E-UTRAN. If the S1 interface INITIAL CONTEXT SETUP REQUEST message may not be transmitted, the UE may perform an Attach procedure or a Tracking Area (TA) Update procedure for "first TAU following GERAN/UTRAN Attach" or "UE radio capability update".

When the UE performs an attach process or a TA update procedure, the MME should delete stored UE radio capability information. When the MME transmits an S1 interface INITIAL CONTEXT SETUP REQUEST or a UE RADIO CAPABILITY MATCH REQUEST message to the E-UTRAN during such a process, the MME should not include any UE radio capability information in such a message.

The E-UTRAN, having received a UE RADIO CAPABILITY MATCH REQUEST message that does not include any UE radio capability information from the MME requests UE radio capability information to the UE, and the UE transmits the UE radio capability information to E-UTRAN in response thereto. Thereafter, the E-UTRAN uploads the S1 interface UE CAPABILITY INFO INDICATION message to the MME.

The MME stores UE radio capability information and includes the UE radio capability information in an initial context setup request message or an UE radio capability match request message in an attaching process for "first TAU following GERAN/UTRAN Attach" or "UE radio capability update" or in other processes other than a TA update process.

When the UE performs a service request or other processes and when the MME has available UE radio capability information or does not have UE radio capability information displayed as available but deleted, the MME transmits an SI interface initial context setup message that does not include any UE radio capability information to the E-UTRAN.

The E-UTRAN, having received a UE RADIO CAPABILITY MATCH REQUEST message that includes no UE radio capability information from the MME requests UE radio capability information to the UE, and the UE transmits the UE radio capability information to the E-UTRAN in response thereto. Thereafter, the E-UTRAN uploads an S1 interface UE CAPABILITY INFO INDICATION message to the MME. The multi-RAT UE distinguished and managed buffers of the cellular network and the WLAN, transmitted a buffer status report (BSR) of the cellular network to the cellular network, and did not transmit a BSR of the WLAN to the AP, which is an access device of the WLAN.

In 802.11 ax, which is a next generation standard of a WLAN, in order to enhance spectral efficiency of the WLAN, a technique in which the UE transmits a BSR of the WLAN to an AP is considered. In order to use such information, a trigger frame is newly defined, and a discussion on a method of scheduling an uplink resource for a UE accessed to the WLAN is required.

When a multi-RAT UE splits and transmits a specific bearer into a cellular network and a WLAN, when integration managing buffers and dynamically assigning a resource according to a channel situation and a load of the cellular network and the WLAN rather than when splitting and managing buffers of the cellular network and the WLAN, a data transmitting time of the multi-RAT UE may be reduced. Thereby, performance enhancement of an entire communication system may be expected.

The present invention provides a method in which a multi-RAT UE reports a multi-RAT integration buffer status in order to dynamically assign a resource of a cellular network and a WLAN, when a cellular controller acquires information about a channel situation and a load of the cellular network and the WLAN.

In a cellular-WLAN fusion environment, when performing data offloading that distributes rapidly increasing data traffic to another network or data simultaneous transmission, rapid access of a WLAN is required for performance enhancement of a fusion system.

Figure 3:
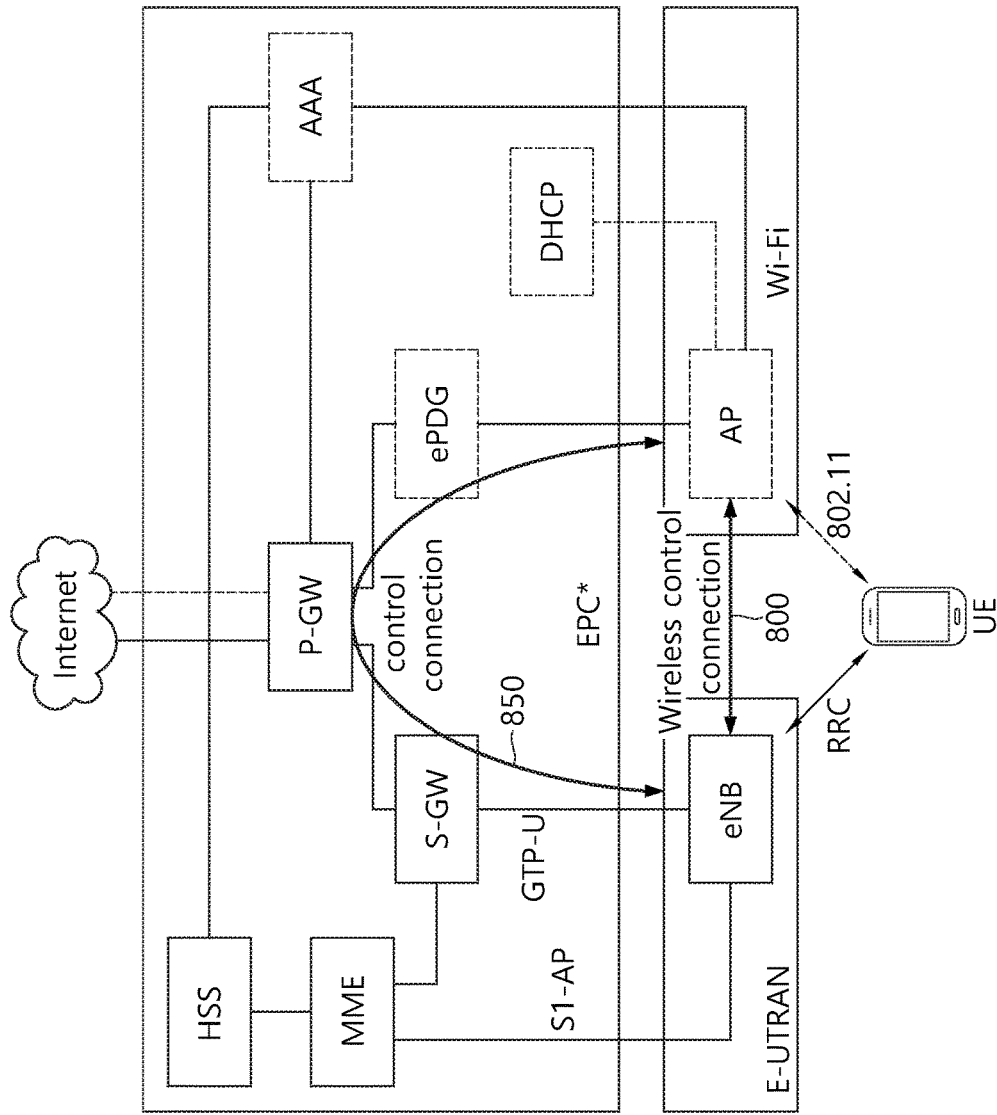
FIG. 3 is a conceptual diagram illustrating interworking between a WLAN and a cellular network according to an exemplary embodiment of the present invention.

FIG. 3 is a conceptual diagram illustrating interworking between a WLAN and a cellular network according to an exemplary embodiment of the present invention.

Referring to FIG. 3, offloading of data may be performed and a maximum processing amount of data may increase through interworking between a WLAN and a cellular network.

A WLAN polling operation based on a cellular network according to an exemplary embodiment of the present invention may be performed based on the following connection between the WLAN and the cellular network.

A wireless control connection 200 may be performed between the eNB and the AP. Further, a wired control connection 250 may be performed through an S-GW, a P-GW, and an ePDG of the EPC. The wired control connection 250 may be performed based on a new interface through a backbone network based on a GPRS tunneling protocol (GTP) or a new protocol. The wireless control connection 200 may be connection between the eNB and the AP. For the wireless control connection 200, the AP may support an LTE protocol stack for communication with the eNB as well as a 802.11 MAC/PHY layer.

According to an exemplary embodiment of the present invention, interworking between a WLAN and a cellular network may be directly performed within a core network such as an evolved packet core (EPC). That is, control information between the WLAN and the cellular network may be directly transmitted and received within a core network.

When the UE may access to both the WLAN and the cellular network, a cellular network system having wide coverage and that transmits control information may be referred to as a primary system, and a WLAN system having narrow coverage and that transmits data may be referred to as a secondary system.

When performing a WLAN polling operation based on a cellular network according to an exemplary embodiment of the present invention, for interworking between the cellular network and the WLAN, an entity related to the cellular network may be used. For example, an existing entity such as an eNB, an MME, and a P-GW may be used for interworking between the cellular network and the WLAN. Alternatively, a new entity for interworking between the cellular network and the WLAN such as an InterWorking Management Entity (IWME) (not shown) may be defined in a core network.

In entities for interworking between heterogeneous networks, an interworking function may be implemented. The interworking function may define a procedure for interworking between heterogeneous networks in a wireless network level and a core network level. An entity for interworking between heterogeneous networks may store and manage information related to an AP.

Hereinafter, it is assumed that the UE is a dual mode UE that can support a WLAN and a cellular network.

Figure 4:
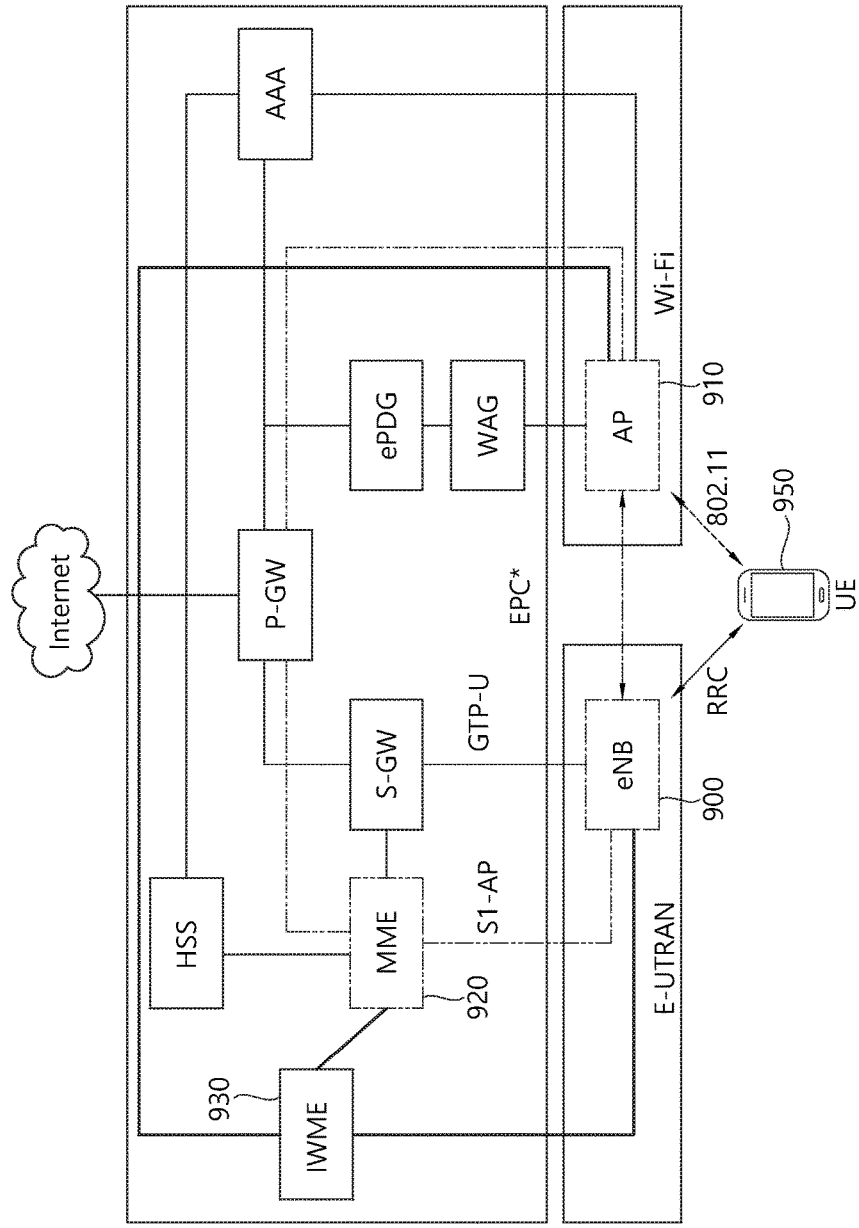
FIG. 4 is a conceptual diagram illustrating a method of managing AP information according to an exemplary embodiment of the present invention.

FIG. 4 is a conceptual diagram illustrating a method of managing AP information according to an exemplary embodiment of the present invention.

FIG. 4 illustrates a method in which a cellular network controls an AP of a WLAN and manages information about the AP.

Referring to FIG. 4, for the control of an AP 310, an air interface between an eNB 300 and the AP 310 may be used. The eNB 310 may control the AP 310 similarly to a general UE that communicates with the eNB 300 based on wireless control connection between the APs 310.

Alternatively, the eNB 300 may control the AP 310 based on a backhaul interface between the eNB 300 and the AP 310. The eNB 300 may control the AP based on a wired control connection.

Alternatively, the eNB 300 may control the AP 310 based on a control interface between an MME 320 and the AP 310. The AP 310 may be controlled based on control connection between the MME 320 and the AP 310, i.e., between the MME 320 and the secondary system of the core network of the cellular network. In order to control the AP based on the MME 320, a wireless control connection between the eNB 300 and the AP 310 may be used.

Alternatively, a control interface between an IWME 330 and the AP 310 may be used for the control of the AP 310. That is, the AP 310 may be controlled based on control connection between the IWME 330 and the secondary system. In this case, in order to control the AP based on the IWME 330, a wireless control connection between the eNB 300 and the AP 310 may be used.

Hereinafter, in a cellular-WLAN fusion environment in which interworking between a WLAN and a cellular network is available, a method in which the multi-RAT UE performs a multi-RAT integration BSR is suggested. Specifically, a method of preparing a multi-RAT integration BSR and the BSR will be described in detail.

Figure 5:
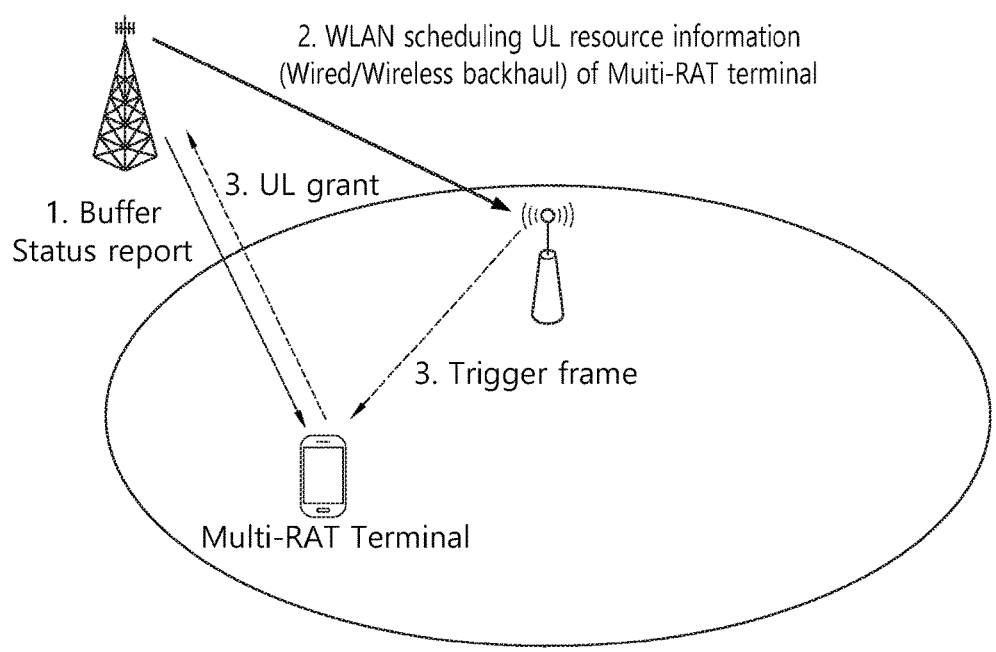
FIG. 5 is a diagram illustrating dynamic multi-RAT scheduling according to an exemplary embodiment of the present invention.

FIG. 5 is a diagram illustrating dynamic multi-RAT scheduling according to an exemplary embodiment of the present invention. Hereinafter, a subject that receives a BSR from the UE in a cellular network is referred to as a cellular controller. The cellular controller may be implemented with a base station or the eNB, the MME, or the IWME of FIG. 4.

The cellular controller may receive a WLAN buffer status report (BSR) of a multi-RAT UE (1. Buffer status report).

The cellular controller may transmit WLAN scheduling UL resource information of the multi-RAT UE to the AP based on such information (2. WLAN Scheduling UL resource information of the multi-RAT UE). Such communication between the cellular controller and the AP may be performed through wired/wireless backhaul.

The cellular controller may transmit a UL grant signal to the multi-RAT UE based on WLAN scheduling resource information (3. UL grant), and the AP may also notify the multi-RAT UE of a trigger frame based on WLAN scheduling UL resource information received from the cellular controller (3. Trigger frame).

In a multi-RAT environment, upon performing uplink, the multi-RAT UE may split and transmit a bearer into a cellular network and a WLAN. In this case, the bearer may be split from a Packet data convergence protocol (PDCP) level and may be split from a radio link control (RLC) or a medium access control (MAC) level.

When a wireless access device for communication through a WLAN, for example a base station, for example an eNB for communication through an AP and a cellular network is physically or logically collocated into one, for split transmission of a bearer, a new interface between the AP and the base station is not required.

However, when the AP and the base station do not have a collocated structure, for split transmission of a bearer, a new interface may be required between the AP and the base station. In such a case, it may be adaptively implemented through individual interworking between an LTE protocol and a WLAN protocol that a bearer input to the cellular network is split from which level to be transmitted to the AP.

In order to enhance a data transmitting rate of the multi-RAT UE, as described above, when the multi-RAT UE determines to split and to UL transmit a specific bearer through the cellular network and the WLAN, the cellular network may configure UL bearer split to the multi-RAT UE.

Such UL bearer split transmission may be performed in change setup later between non-split bearer and split bearer as well as initial setup. When a bearer is not split but is changed to be split later, information about a Basic Service Set Identifier (BSSID) or a Service Set Identifier (SSID) of the AP may be additionally transmitted to the multi-RAT UE.

The cellular controller and the AP may know information about a dynamic multi-RAT scheduling support capability. Such information exchange may be performed in a process in which an AP and a cellular controller such as an eNB or an IWME transmit/receive each information for cellular network/WLAN interworking. That is, in such a process, the cellular controller and the AP may transmit and receive information about a dynamic multi-RAT scheduling support capability.

In this way, when the cellular controller and the UE have a dynamic multi-RAT scheduling support capability, a subject that triggers a dynamic multi-RAT integration BSR may be a cellular controller or may be a UE.

Figure 6:
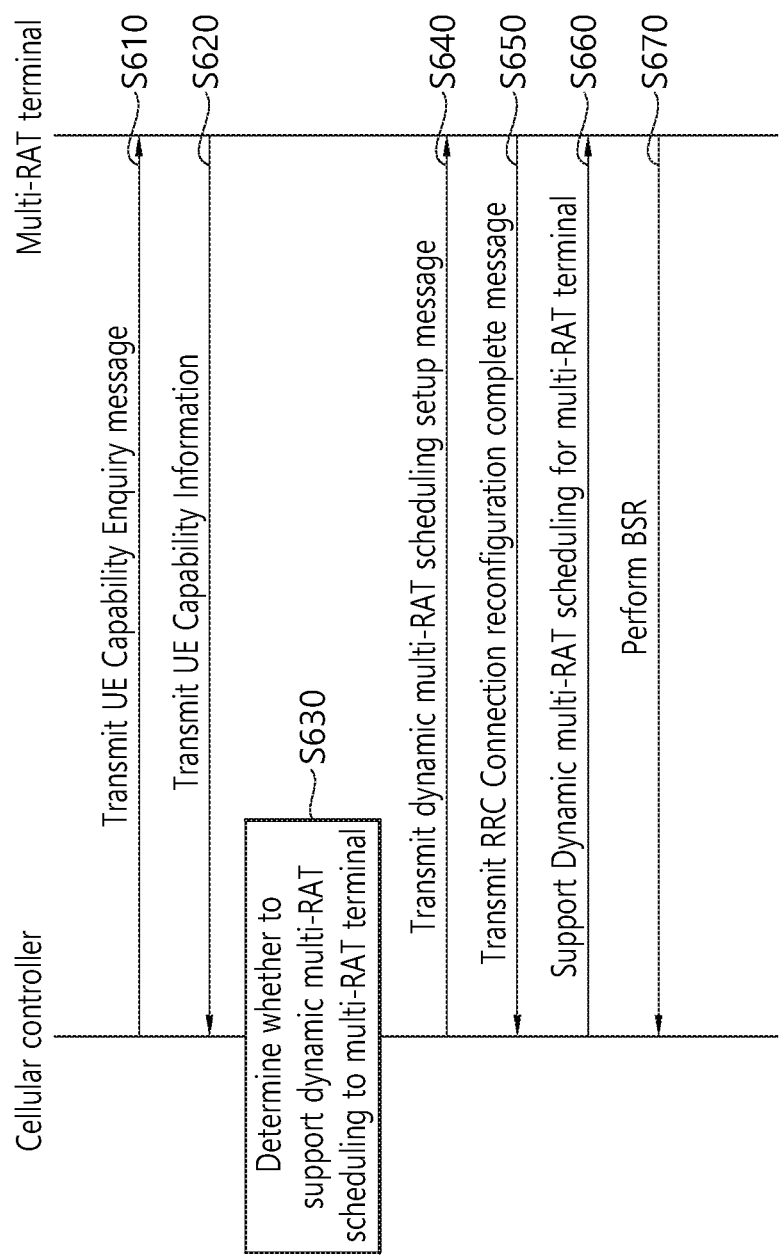
FIG. 6 is a diagram illustrating a BSR method, when a subject that triggers dynamic multi-RAT integration scheduling is a cellular controller according to an exemplary embodiment of the present invention.

FIG. 6 is a diagram illustrating a BSR method, when a subject that triggers dynamic multi-RAT integration scheduling is a cellular controller according to an exemplary embodiment of the present invention.

In order to determine whether the UE supports a multi-RAT integration buffer, the cellular controller may transmit a UE Capability Enquiry message to the UE (S610).

The UE, having received the UE Capability Enquiry message may transmit UE Capability Information to the cellular controller in response thereto (S620).

In order to additionally notify whether the UE supports a multi-RAT integration buffer, the UE Capability Information may include a UE-Category IE in which a UE category is newly defined.

Alternatively, the UE may update a changed UE category through a NAS procedure using a high layer due to information notifying whether the UE supports a multi-RAT integration buffer. Table 1 represents an example of the changed UE category.

TABLE 1

| UE Category | Total layer 2 buffer size [bytes] | Support for Multi-RAT aggregated buffer |
| --- | --- | --- |
| Category 1 | 150 000 | No |
| Category 2 | 700 000 | No |
| Category 3 | 1 400 000 | No |
| Category 4 | 1 900 000 | No |
| Category 5 | 3 500 000 | No |
| Category 6 | 3 300 000 | No |
| Category 7 | 3 800 000 | No |
| Category 8 | 42 200 000 | No |
| Category 9 | 4 800 000 | No |
| Category 10 | 5 200 000 | No |
| Category 11 | 42 200 000 | Yes |
| Category 12 | 4 800 000 | Yes |
| Category 13 | 5 200 000 | Yes |
| Category 14 | xx | Yes |
| Category 15 | yy | Yes |
| ... | ... | ... |

As shown in Table 1, when a multi-RAT integration buffer is supported, a value of a total layer 2 buffer size may be defined larger than that of an existing case, the UE category may be additionally defined according to whether the multi-RAT integration buffer is supported.

The cellular controller may determine whether to support dynamic multi-RAT scheduling to the multi-RAT UE (S630).

For example, when the cellular controller is physically or logically non-collocated with an AP, the cellular controller may determine whether to support dynamic multi-RAT scheduling according to whether a scheduling time of the UE is shortened in a case in which dynamic multi-RAT scheduling is supported and other cases in consideration of latency through wired/wireless backhaul between the cellular controller and the AP, a cellular/WLAN load, and a channel situation of the cellular network/WLAN.

When the cellular controller determines dynamic multi-RAT scheduling support of the multi-RAT UE for system performance enhancement, the cellular controller may notify the multi-RAT UE whether to support dynamic multi-RAT scheduling using a Dynamic multi-RAT scheduling configuration (S640).

For example, in order to notify the UE of a capability thereof that supports Dynamic multi-RAT scheduling, the cellular controller may include and transmit dynamic multi-RAT scheduling information in common information within a newly defined System Information Block (SIB) xx.

When a UE having a dynamic multi-RAT scheduling capability among UEs, having received information about whether to support dynamic multi-RAT scheduling through the SIB (re)selects or connects a cell, the UE may preferentially select a cell that supports dynamic multi-RAT scheduling.

Further, the cellular controller may additionally include and transmit a time threshold value (Timethreshold) in dynamic multi-RAT scheduling information. The Timethreshold may be used as a condition in which the UE triggers dynamic multi-RAT scheduling.

According to another example, dynamic multi-RAT scheduling setup information may be included in RadioResourceConfigDedicated of an RRC Connection (Re)configuration.

The UE, having received the dynamic multi-RAT scheduling setup message may know any bearer, logical channel, and logical channel group that support dynamic multi-RAT scheduling.

FIGS. 7A to 7C are diagrams illustrating a dynamic multi-RAT scheduling setup message according to an exemplary embodiment of the present invention.

As shown in FIG. 7A, when dynamic multi-RAT scheduling is supported, it may be represented that dynamic multi-RAT scheduling is supported using a Distributed Resource Block (DRB)/logicalChannelIdentity/logicalChannelgroupIdentity ID.

Alternatively, as shown in FIG. 7B, it may be represented whether dynamic multi-RAT scheduling is supported using a bitmap in which Dynamic multi-RAT scheduling is supported. One bit may correspond to every individual DRB/logicalChannelIdentity/logicalChannelgroupIdentity. For example, a bit map may be configured to map to an ID of FIG. 7A. A bit of a DRB/logicalChannelIdentity/logicalChannelgroupIdentity that supports dynamic multi-RAT scheduling may be set and transmitted to '1', and a bit of a DRB/logicalChannelIdentity/logicalChannelgroupIdentity that does not support dynamic multi-RAT scheduling may be set and transmitted to '0'.

FIG. 7C is a diagram illustrating a dynamic multi-RAT scheduling setup message according to another exemplary embodiment of the present invention.

In dynamic multi-RAT scheduling setup, when an entire DRB/logicalChannelIdentity/logicalChannelgroupIdentity is used for indicating whether dynamic multi-RAT scheduling is supported, the cellular controller may transmit a dynamic multi-RAT scheduling setup message of FIG. 7C to the multi-RAT UE.

When dynamic multi-RAT scheduling setup is complete, the UE may always transmit a multi-RAT integration BSR or only when a specific condition is satisfied, the UE may transmit a multi-RAT integration BSR to the cellular controller.

Such a selection may be previously defined or may be determined according to determination of the cellular controller. When the cellular controller determines whether to transmit a BSR, the cellular controller may include information that indicates whether a BSR transmission condition is added in a dynamic multi-RAT scheduling setup message.

For example, information that indicates whether a condition is added to BSR transmission may be defined to Application Methods indicator ENUMERATED {Always, Optional}, and a BSR procedure of the UE may be changed according to determination of the cellular controller.

When it is set that the UE transmits a multi-RAT integration BSR under a specific condition, the cellular controller may additionally include a Timethreshold in a dynamic multi-RAT scheduling setup message to transmit the dynamic multi-RAT scheduling setup message to the multi-RAT UE. The Timethreshold may be used as a condition in which the UE performs dynamic multi-RAT scheduling.

The multi-RAT UE, having received the dynamic multi-RAT scheduling setup message may transmit a RRC Connection Reconfiguration Complete to the cellular controller (S650).

The multi-RAT UE, having successfully received dynamic multi-RAT scheduling setup information transmitted from the cellular controller and having succeed in resource setup based on the dynamic multi-RAT scheduling setup information transmits an RRC Connection Reconfiguration Complete to the cellular controller and thus may notify that the multi-RAT UE performs or can perform a procedure for dynamic multi-RAT scheduling.

The cellular controller, having received the RRC Connection Reconfiguration Complete recognizes that dynamic multi-RAT scheduling setup with the multi-RAT UE was succeeded and supports dynamic multi-RAT scheduling for the multi-RAT UE (S660).

The multi-RAT UE, having terminated dynamic multi-RAT scheduling setup with the cellular controller (when the foregoing specific condition is satisfied) may perform a BSR with a new BSR format (S670).

As described above, the multi-RAT UE that receives support of dynamic multi-RAT scheduling from the cellular controller may perform the following operation according to an application method indicator received from the cellular controller in a previously defined or setup process. The application method indicator may represent whether a condition is added to BSR transmission.

For example, as an application method indicator is set to "Always", when the UE may always transmit a multi-RAT integration BSR, before receiving a changed dynamic multi-RAT scheduling setup message from the cellular controller, i.e., until receiving a message that supports no-dynamic multi-RAT scheduling, the multi-RAT UE may always transmit a multi-RAT integration BSR to the cellular controller.

In this case, a trigger condition and parameter setup and procedure for the BSR may reuse an existing method.

According to another example, as an application method indicator is set to "optional", only when the UE satisfies a specific condition, when a multi-RAT integration BSR may be transmitted, before receiving a changed dynamic multi-RAT scheduling setup message from the cellular controller, i.e., until receiving a message that supports no-dynamic multi-RAT scheduling, only when a specific condition is satisfied (e.g., when an access time that performs a BSR with the WLAN exceeds a time threshold value), the multi-RAT UE may transmit a multi-RAT integration BSR to the cellular controller.

When a specific condition is not satisfied, the multi-RAT UE may perform a BSR with an RAT of each of the cellular network and the WLAN.

In this case, a trigger condition and parameter setup and procedure for the BSR may reuse an existing method.

When the multi-RAT UE performs a BSR, a specific condition, for example when a condition that performs a BSR is added only when an access time that performs a BSR with the WLAN exceeds a time threshold value, a BSR of a case in which such a specific condition is satisfied and a BSR of other cases should be able to be distinguished. For this reason, a BSR format may be newly defined.

Figure 8A:
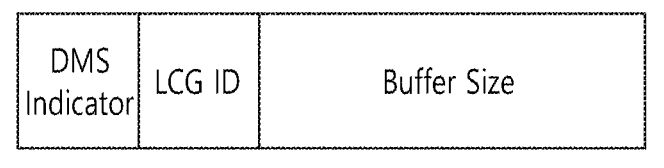

FIGS. 8A and 8B are diagrams illustrating a BSR format according to an exemplary embodiment of the present invention.

As shown in FIGS. 8A and 8B, a dynamic multi-RAT scheduling indication field (DMS indication field) may be added to an existing BSR format.

A BSR of FIG. 8A may be configured with a DMS indication field, a logical channel group (LCG) ID field, and a buffer size field including a buffer size.

Further, as shown in FIG. 8B, the BSR may be configured with a field representing a buffer size of an LCG to which a DMS indication field, an LCG ID field, and a buffer size field are coupled.

An indicator of the DMS indication field may be set to '1' to a short BSR for dynamic multi-RAT scheduling, and an indicator may be set to '0' to a case other than the short BSR.

Further, in a long BSR, a DMS indicator is defined to 4 bits and it may be represented whether the DMS is applied to each LCG using 4 bits.

According to an exemplary embodiment of the present invention, in order to support several type BSRs shown in FIGS. 8A and 8B, a Logical channel ID (LC ID) value that identifies an LC according to each type may be defined. In this case, a definition of the LCID may be changed according to a format field of the foregoing BSR.

An example of the LCID is represented in Table 2.

TABLE 2

| LCID | |
|---|---|
| 01011 | Multi-RAT short BSR (e.g., FIG. 7A) |
| 01100 | Multi-RAT long BSR (e.g., FIG. 7C) |
| 11101 | Cellular short BSR |
| 11110 | Cellular long BSR |

In Table 2, "01011" may represent a 'short BSR' in a multi-RAT environment, and "01100" may represent a 'long BSR' in a multi-RAT environment, as in the present invention. A buffer size may distinguish a wireless network through an LCG ID.

"11101" of Table 2 may represent a 'short BSR' among BSRs of an existing cellular network, and "11110" may represent a 'long BSR' among BSRs of an existing cellular network.

When the multi-RAT UE in which dynamic multi-RAT scheduling setup is terminated always performs a multi-RAT integration BSR without a specific condition, an existing BSR format and an LCID may be reused.

A layer that transmits a BSR according to radio protocol architectures may be any one of a PDCP/RLC/MAC. The multi-RAT UE may transmit a BSR of a PDCP/RLC/MAC layer of a logical channel of a bearer to which dynamic multi-RAT scheduling is set to the cellular controller.

Figure 9A:
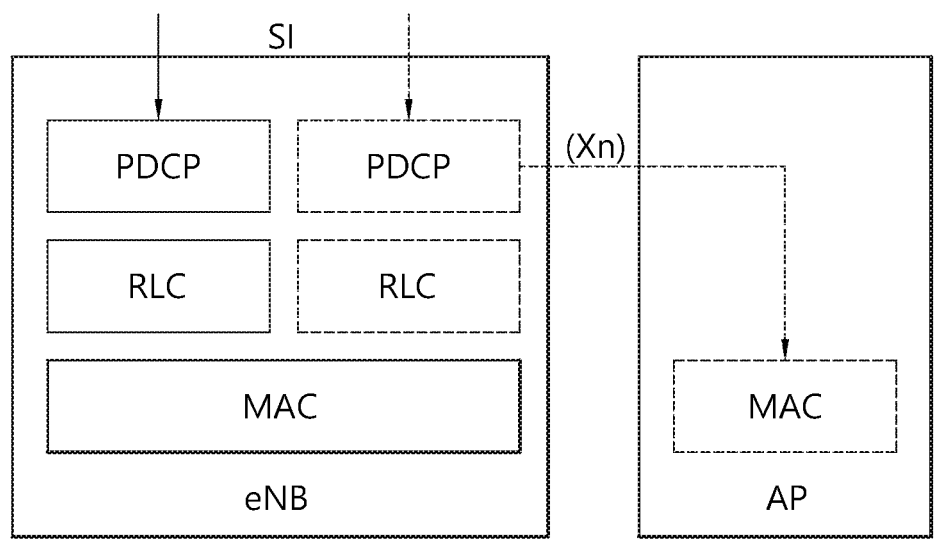
FIG. 9A is a diagram illustrating an example in which a bearer is split in a multi-RAT integration system.

For example, as shown in FIG. 9A, when a cellular network of the UE and a bearer of a WLAN are branched from the PDCP, the multi-RAT UE may transmit the BSR of the PDCP layer to the cellular controller.

Figure 9B:
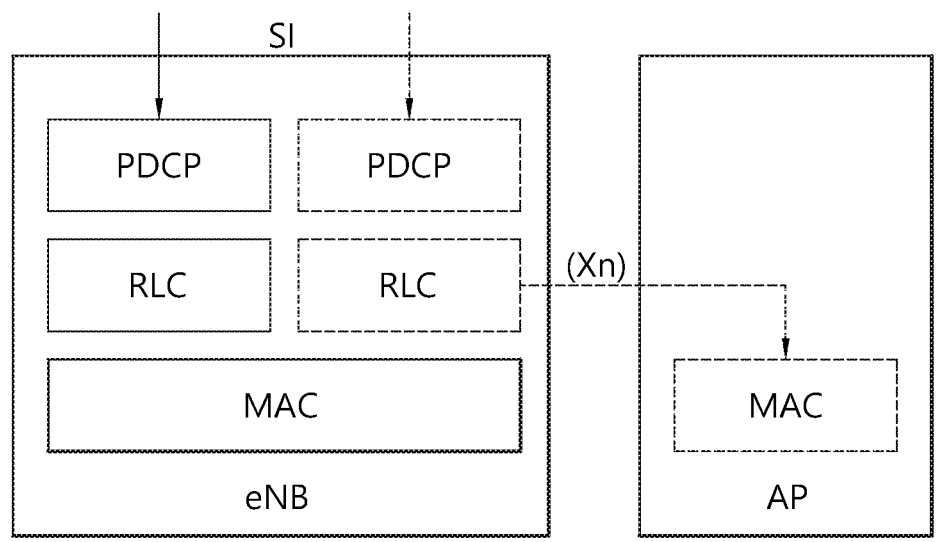
FIG. 9B is a diagram illustrating another example in which a bearer is split in a multi-RAT integration system.

Alternatively, as shown in FIG. 9B, when a cellular network of the UE and a bearer of a WLAN are branched from the RLC, the multi-RAT UE may transmit the BSR of the PDCP/RLC layer to the cellular controller.

According to another exemplary embodiment of the present invention, a subject that triggers dynamic multi-RAT integration scheduling may be a multi-RAT UE.

Figure 10:
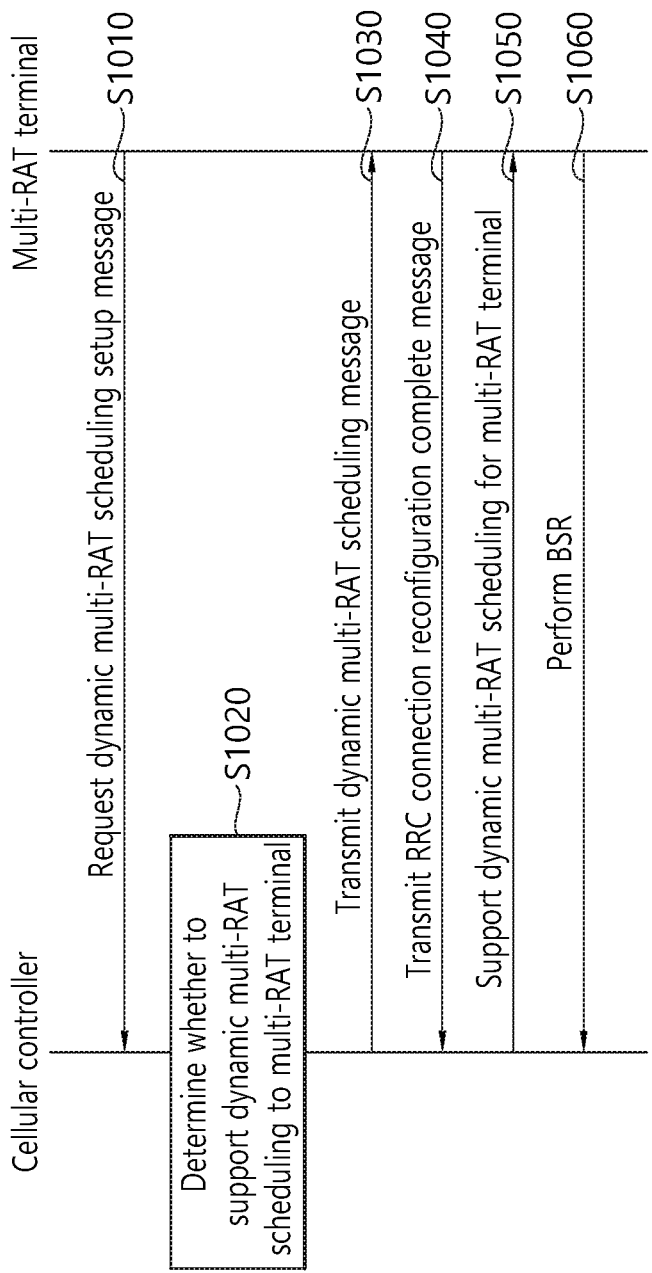
FIG. 10 is a diagram illustrating a BSR method, when a subject that triggers dynamic multi-RAT integration scheduling is a multi-RAT terminal according to another exemplary embodiment of the present invention.

FIG. 10 is a diagram illustrating a BSR method, when a subject that triggers dynamic multi-RAT integration scheduling is a multi-RAT UE according to another exemplary embodiment of the present invention.

The multi-RAT UE may request dynamic multi-RAT scheduling setup information to the cellular controller (S1010).

When the multi-RAT UE transmits uplink data to the cellular controller and the AP through a split bearer, the UE may acquire dynamic multi-RAT scheduling related information through the SIB.

Alternatively, when the cellular controller may support dynamic multi-RAT scheduling and when the UE may also support dynamic multi-RAT scheduling, the UE may request dynamic multi-RAT scheduling support to the cellular controller through a dynamic multi-RAT scheduling request message.

For example, when the UE performs the BSR with the WLAN, if an access time for transmitting the BSR exceeds a time threshold value included in the SIB, the UE may trigger dynamic multi-RAT scheduling and transmit a dynamic multi-RAT scheduling request message to the cellular controller. The dynamic multi-RAT scheduling request message may include a DRB, a logical channel, or an ID of a logical channel group in which the UE wants to perform dynamic multi-RAT scheduling.

The cellular controller, having received the dynamic multi-RAT scheduling request message from the multi-RAT UE may determine whether to support dynamic multi-RAT scheduling to the UE in consideration of a load and a channel situation of a cellular network/WLAN (S1020).

When the cellular controller determines to support dynamic multi-RAT scheduling for the multi-RAT UE, the cellular controller may transmit a dynamic multi-RAT scheduling message to the multi-RAT UE (S1030).

In this case, the dynamic multi-RAT scheduling message may use a format described with reference to FIGS. 7A to 7C.

The UE, having received the dynamic multi-RAT scheduling message may transmit an RRC connection reconfiguration complete message representing that the message has been appropriately received to the cellular controller (S1040).

A subsequent process is similar to a process after step S660 of FIG. 6 and therefore a detailed description thereof will be omitted.

In this way, according to the present invention, when the cellular controller acquires information about a channel situation and a load of a cellular network and a WLAN, in order to dynamically assign a resource of the cellular network and the WLAN, a method in which the multi-RAT UE reports a multi-RAT integration buffer status is provided.

Figure 11:
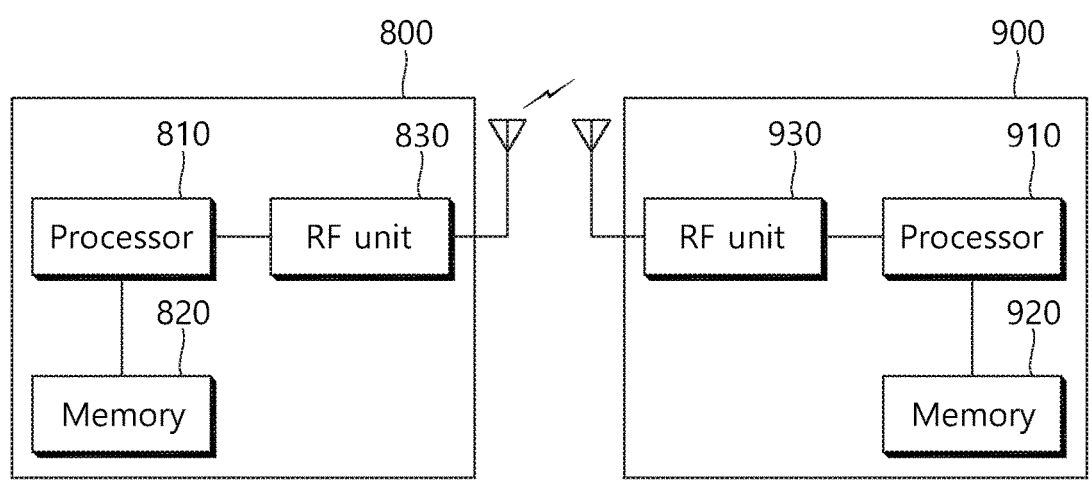
FIG. 11 is a block diagram illustrating a configuration of a wireless communication system according to an exemplary embodiment of the present invention.

FIG. 11 is a block diagram illustrating a configuration of a wireless communication system according to an exemplary embodiment of the present invention.

A base station 800 includes a processor 810, a memory 820, and a radio frequency (RF) unit 830. The processor 810 implements a suggested function, process, and/or method. Layers of a wireless interface protocol may be implemented by the processor 810. The memory 820 is connected to the processor 810 to store various information for driving the processor 810. The RF unit 830 is connected to the processor 810 to transmit and/or receive a wireless signal. The base station 800 of FIG. 11 may include the foregoing cellular base station, EUTRAN eNB, or IWME.

A terminal 900 includes a processor 910, a memory 920, and an RF unit 930. The processor 910 implements a suggested function, process, and/or method. Layers of a wireless interface protocol may be implemented by the processor 910. The memory 920 is connected to the processor 910 to store various information for driving the processor 910. The RF unit 930 is connected to the processor 910 to transmit and/or receive a wireless signal. The terminal 900 of FIG. 11 may include the foregoing multi-RAT UE.

The processor may include an application-specific integrated circuit (ASIC), another chipset, a logic circuit, and/or a data processor. The memory may include a read-only memory (ROM), a random access memory (RAM), a flash memory, a memory card, a storage medium, and/or another storage device. The RF unit may include a baseband circuit for processing a wireless signal. When an exemplary embodiment is implemented with software, the above-described technique may be implemented with a module (process, function) that performs the above-described function. The module may be stored at a memory and may be executed by the processor. The memory may exist at the inside or the outside of the processor and may be connected to the processor with well-known various means.

In the above exemplary systems, although the methods have been described on the basis of the flowcharts using a series of steps or blocks, the present invention is not limited to the sequence of the steps, and some of the steps may be performed with different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting a buffer status report (BSR) in a multi-radio access technology (RAT) system including a cellular network and a wireless local area network (WLAN) by a multi-RAT user equipment (UE), the method comprising:
   receiving a setup message of multi RAT integration scheduling from a cellular controller,
   wherein the setup message of the multi-RAT integration scheduling includes condition information including a time threshold value which is a reference value to be compared with an access time, and
   wherein the access time is a time interval during which a BSR is transmitted through the WLAN;
   transmitting a multi-RAT integration BSR to the cellular controller based on the setup message when the access time exceeds the time threshold value; and
   transmitting a data through resources that are dynamically allocated resources of the cellular network and the WLAN based on the multi-RAT integration BSR.

2. The method of claim 1, wherein the setup message of the multi-RAT integration scheduling is included and received in a system information block or an RRC connection (re)setup message.

3. The method of claim 1, further comprising receiving a UE capability enquiry message that determines whether the multi-RAT UE supports a multi-RAT integration buffer from the cellular controller.

4. The method of claim 1,
   wherein the multi-RAT integration BSR is transmitted based on a branched layer of a bearer to which the multi-RAT integration scheduling is set, and
   wherein the bearer is split into the cellular network and the WLAN.

5. A multi-RAT user equipment (UE) of transmitting a buffer status report (BSR) in a multi-radio access technology (RAT) system including a cellular network and a wireless local area network (WLAN), the multi-RAT UE, comprising:
   a signal transmitting and receiving unit; and
   a processor connected to the signal transmitting and receiving unit,
   wherein the processor is configured to:
      receive a setup message of multi-RAT integration scheduling from the cellular controller,
      wherein the setup message of the multi-RAT integration scheduling includes condition information including a time threshold value which is a reference value to be compared with an access time, and
      wherein the access time is a time interval during which a BSR is transmitted through the WLAN,
      transmit a multi-RAT integration BSR to the cellular controller based on the setup message when the access time exceeds the time threshold value, and
      transmit a data through resources that are dynamically allocated resources of the cellular network and the WLAN based on the multi-RAT integration BSR.

6. The method of claim 1,
   wherein the multi-RAT integration BSR includes a multi-RAT scheduling indication field, an identifier of a logical channel group (LCG) and a buffer size for the LCG, and
   wherein the multi-RAT scheduling indication field indicates whether the multi-RAT integration scheduling is applied to the LCG.

7. The terminal of claim 5,
   wherein the multi-RAT integration BSR includes a multi-RAT scheduling indication field, an identifier of a logical channel group (LCG) and a buffer size for the LCG, and
   wherein the multi-RAT scheduling indication field indicates whether the multi-RAT integration scheduling is applied to the LCG.

* * * * *